United States Patent [19]
Yoshida

[11] Patent Number: 5,566,774
[45] Date of Patent: *Oct. 22, 1996

[54] OPERATING METHOD FOR A HYBRID VEHICLE

[75] Inventor: Masato Yoshida, Kyoto, Japan

[73] Assignee: Mitsubishi Jidosha Kogyo Kabushiki Kaisha, Tokyo, Japan

[ * ] Notice: The term of this patent shall not extend beyond the expiration date of Pat. No. 5,327,991.

[21] Appl. No.: 476,331

[22] Filed: Jun. 7, 1995

Related U.S. Application Data

[62] Division of Ser. No. 60,991, May 14, 1993, Pat. No. 5,492,190.

[30] Foreign Application Priority Data

| May 15, 1992 | [JP] | Japan | 4-123814 |
| May 15, 1992 | [JP] | Japan | 4-123815 |
| May 15, 1992 | [JP] | Japan | 4-123819 |

[51] Int. Cl.⁶ .................................................. B60K 13/04
[52] U.S. Cl. ........................... 180/65.4; 180/309; 60/300
[58] Field of Search .......................... 180/65.1, 65.2, 180/65.3, 65.4, 309; 60/274, 300, 303; 290/16, 17, 45, 50

[56] References Cited

U.S. PATENT DOCUMENTS

| 3,719,881 | 3/1973 | Shibata et al. | 290/17 |
| 3,888,325 | 6/1975 | Reinbeck | 180/65.2 |
| 3,923,115 | 12/1975 | Helling | 180/65.2 |
| 3,991,357 | 11/1976 | Kaminski | 290/50 |
| 4,187,436 | 2/1980 | Etienne | 290/45 |
| 4,438,342 | 3/1984 | Kenyon | 290/45 |
| 4,470,476 | 9/1984 | Hunt . | |
| 4,951,769 | 8/1990 | Kawamura | 180/65.4 |
| 5,212,431 | 5/1993 | Origuchi et al. | 180/65.4 |
| 5,323,868 | 6/1994 | Kawashima . | |
| 5,327,991 | 7/1994 | Yoshida | 180/65.4 |

FOREIGN PATENT DOCUMENTS

| 0511654 | 4/1992 | European Pat. Off. . |
| 2419832 | 10/1979 | France . |
| 4331402 | 11/1992 | Japan . |
| 623986 | 11/1945 | United Kingdom . |

OTHER PUBLICATIONS

Hunter, N., "Hybrid Bus Responds to Urban Pollution," Product Engineering, vol. 40, No. 23, Nov. 17, 1969, pp. 12–13.

Lawrence et al., "Microprocessor Control of a Hybrid Energy System", Proceedings of the 24th Intersociety Energy Conversion Engineering Conference, vol. 2, Aug. 1989, pp. 737–741.

*Primary Examiner*—Kevin Hurley
*Assistant Examiner*—Min Yu

[57] ABSTRACT

An operating method for a hybrid vehicle which has an electric motor for driving the vehicle and an internal combustion engine for power generation. Upon completion of the activation of a catalyst, the engine is operated in warm-up mode with a small throttle valve opening, and when the output of a water temperature gauge thereafter reaches a predetermined value and the warm-up operation has completed, the engine is operated with a large throttle valve opening for the power generation. Thus, the hybrid vehicle can enjoy improved exhaust gas characteristics and increased cruising range and power performances. If it is determined that the storage amount of a battery is smaller than a predetermined storage amount when a starter key is so operated as to stop the vehicle, an alarm lamp is lighted, thus informing the driver of engine operation, and the engine operation is continued until the predetermined battery storage amount is reached or a predetermine time elapses from the start of the engine operation, whereby the battery is reliably charged. Accordingly, the battery can be reliably charged with power necessary to start the vehicle, and the cruising range and power performances of the vehicle are improved.

4 Claims, 11 Drawing Sheets

OPERATING METHOD FOR A HYBRID VEHICLE

This application is a divisional of application Ser. No. 08/060,991, filed on May 14, 1993 U.S. Pat. No. 5,492,190, the entire contents of which are hereby incorporated by reference.

BACKGROUND OF THE INVENTION

The present invention relates to a hybrid vehicle provided with an electric motor used to drive the vehicle and an internal combustion engine for power generation. More particularly, the present invention is directed to an operating method for an internal combustion engine for power generation of a hybrid vehicle, which permits an increased cruising range and improved power performances of the vehicle without abandoning an advantage of an electric vehicle an excellent exhaust gas characteristics.

Recently, the regulations on exhaust gas from those vehicles which use an internal combustion engine as their drive source have been made more rigorous to tackle environmental pollution. In this respect, various new technologies have been developed. Electric vehicles, which use an electric motor as their drive source and produce no exhaust gas, should be ideal motor vehicles for reduction of the exhaust gas amount. Typical electric vehicles are designed so that a battery is used to supply the electric motor with electric power. Naturally, however, the available battery capacity for each vehicle is limited, so that the power performances are poorer and the cruising range is shorter than those of the vehicles which use an internal combustion engine as the drive source. In order to make the electric vehicles more popular, these technical problems are expected to be solved.

Hybrid vehicles, which are furnished with a generator, driven by an internal combustion engine, for battery charging, are believed to be promising modern electric vehicles which can enjoy an increased cruising range.

Generally, hybrid vehicles are equipped with an exhaust gas purifier for improving the emission characteristics of the engine. If, however, the engine operation is started for the battery charging before the catalyst of the exhaust gas purifier is activated, the emission characteristics of the engine are spoiled. Even in the case where the engine operation is started after the catalyst is activated and properly functions, the purifying effect of the catalyst is lowered due to a deviation of the air-fuel ratio of a mixture supplied to the engine from a stoichiometric ratio, if the engine is in a cool state in which fuel evaporation is low while the amount of fuel supply is corrected to a larger value. In such cases, the emission characteristics are lowered.

In general, hybrid cars are designed so that the internal combustion engine for power generation is operated at a constant speed in order to improve its exhaust gas characteristics and reduce its fuel consumption. During such a constant-speed operation of the engine, the amount of electric power generated by the generator driven by the engine is substantially constant without regard to the operating state of the vehicle. Meanwhile, the vehicle is operated in various states. Thus, in a high-load operating state in which the electric motor for vehicle drive requires an increased electric power, the power generated by the generator may be smaller than the required electric power, making it necessary to supply electric power from the battery. Accordingly, if high-load operation is continued and the storage amount of the battery decreases, the amount of power supplied from the battery to the electric motor also decreases, thus lowering the power performances of the vehicle and shortening the cruising range. If the vehicle is stopped with the battery insufficiently charged, even the power supply to the catalyst heater for catalyst activation may possibly fails at restart of the vehicle. In such cases, the exhaust gas purifier does not function properly, so that exhaust gas containing pollutant or noxious gases is discharged from the engine when the engine is operated for the power generation.

In conventional hybrid vehicles, moreover, the operation of the power-generation engine is stopped when the driver turns off the starter key of the vehicle to stop the vehicle. Accordingly, when the starter key is turned off and the engine operation stops, the battery charging is forcibly terminated even though the engine had been operated for charging the battery at that time. Thus, the battery remains in an insufficiently charged state, possibly making it impossible to restart the vehicle.

OBJECT AND SUMMARY OF THE INVENTION

An object of the present invention is to provide an operating method for a hybrid vehicle provided with an electric motor used to drive the vehicle and an internal combustion engine for power generation, which method permits improvement of the cruising range and power performances of the vehicle, without abandoning an advantage of an electric vehicle having an excellent exhaust gas characteristics.

Another object of the present invention is to provide an operating method for a hybrid car, which can ensure the exhaust gas purifying effect of an exhaust gas purifier mounted on the vehicle, increase the cruising range, and improve the power performances of the vehicle.

A still another object of the present invention is to provide an operating method for a hybrid vehicle, which is capable of reliably maintaining the storage amount of a battery necessary to start vehicle running, and permitting the vehicle to have an increased cruising range and improved power performances.

According to one aspect of the present invention, there is provided an operating method for a hybrid car which has an electric motor for driving the vehicle, a battery for supplying electric power to the electric motor, a generator for charging the battery, an internal combustion engine operatively isolated from the electric motor and used to drive the generator, a starter for starting the internal combustion engine, and an exhaust gas purifier. This method comprises the steps of: determining by a controller whether drive of the internal combustion engine is requested; detecting the temperature of an exhaust purifying catalyst of the exhaust gas purifier by means of a catalyst temperature sensor; and determining whether the detected temperature of the catalyst is lower than a predetermined value. When it is determined that the drive of the engine is requested and that the temperature of the catalyst is lower than the predetermined value, a series of steps is executed under the control of the controller. The series of steps includes the steps of: stopping the internal combustion engine; supplying electric power to an electric heater for heating the catalyst, thereby heating the electric heater; and starting the internal combustion engine by the starter when the temperature of the catalyst becomes higher than the predetermined value.

Preferably, the operating method for a hybrid vehicle further includes the step of determining whether a warm-up operation (run the engine to increase engine temperature to a certain level) of the internal combustion engine is completed, and power generation of the generator by means of the internal combustion engine is started when it is determined that the warm-up operation of the internal combustion engine is completed.

Preferably, the internal combustion engine is operated in an operating condition in which an amount of fuel consumed by the internal combustion engine is small.

Preferably, the operating method for a hybrid vehicle further includes the step of detecting the storage amount of the battery, and power generation, by means of the internal combustion engine, for charging the battery is continued under the control of the controller, if the storage amount of the battery at an instant at which the vehicle is stopped is smaller than a predetermined value. More preferably, the power generation by means of the internal combustion engine for charging the battery, effected after the vehicle is stopped is continued until the storage amount of the battery becomes greater than the predetermined value. Alternatively, the power generation by means of the internal combustion engine for charging the battery, effected after the vehicle is stopped, is continued for a predetermined period of time. More preferably, information indicating that the internal combustion engine is in operation is given under the control of the controller, while the power generation, by means of the internal combustion engine, for charging the battery is continued after the vehicle is stopped.

According to another aspect of the present invention, there is provided an operating method for a hybrid vehicle which has an electric motor for driving the vehicle, a vehicle drive battery for supplying electric power to the electric motor, a generator for charging the vehicle drive battery, an internal combustion engine operatively isolated from the electric motor and used to drive the generator, a starter for starting the internal combustion engine, and an exhaust gas purifier. This method comprises the steps of: determining by a controller whether drive of the internal combustion engine is requested; detecting the temperature of an exhaust purifying catalyst of the exhaust gas purifier by means of a catalyst temperature sensor; and determining whether the detected temperature of the catalyst is lower than a predetermined value. When it is determined that the drive of the engine is requested and that the temperature of the catalyst is lower than the predetermined value, a series of steps is executed under the control of the controller. The series of steps includes: stopping the internal combustion engine; supplying electric power from a heater battery to an electric heater for heating the catalyst, thereby heating the electric heater; and starting the internal combustion engine by the starter when the temperature of the catalyst becomes higher than the predetermined value.

The present invention is advantageous in that a heater for heating a catalyst is supplied with electric power, if the temperature of the catalyst of an exhaust purifier at an instant at which the drive of an engine is requested is lower than a predetermined value, and in that the engine is started after the catalyst temperature exceeds the predetermined value as a result of power supply to the heater, so that the exhaust purifier fully exhibits its purifying effect. Thus, battery charging by which a vehicle is permitted to have improved power performances and increased cruising range is performed, without causing the emission characteristics of the engine to be lowered.

Preferably, the operation of the engine for power generation is started after both activation of the catalyst and a warm-up operation of the engine are completed. Thus, the battery charging can be performed without causing the lowering of the emission characteristics, so that the power performances of the vehicle are improved and the cruising range thereof is increased. Further, the warm-up operation of the engine is conducted after completion of activation of the catalyst, in a state where the air-fuel ratio of a mixture is kept in the vicinity of the stoichiometric ratio at which a proper exhaust gas purifying effect is exhibited. This prevents the emission characteristics of the engine from being lowered due to a deviation of the air-fuel ratio from the stoichiometric ratio, even if the engine is operated in a cool state.

Moreover, according to a specific embodiment of the present invention in which the power generation by the internal combustion engine for battery charging is continued if the storage amount of the battery at an instant at which the vehicle is stopped is lower than a predetermined value, the battery storage amount necessary to start the vehicle running is always maintained, so that no difficulty is found in starting the vehicle running. When the engine is operated after stoppage of the vehicle running, information indicating that the engine is in operation may be given. This clarifies that the engine operation after stoppage of the vehicle running is not caused by a failure of the vehicle, etc. The engine operation after the stoppage of vehicle running may be finished when the storage amount of the battery reaches a predetermined storage amount as a result of the engine operation, or when a predetermined time period has elapsed from the start of the engine operation. This permits reliable battery charging. Further, the engine operation after stoppage of vehicle running may be forcibly interrupted. This makes it possible to complete, within an appropriate time period, the engine operation which is effected in an garage easily filled with exhaust gas, or the engine operation effected at night during which noise should be suppressed.

Another advantage of the present invention resides in that a heater battery for electric power supply to a heater for heating a catalyst is provided separately from a vehicle drive battery for power supply to an electric motor. This makes it possible to charge the catalyst heater battery preferentially to the charging of the vehicle drive battery. Thus, it is possible to always supply electric power from the catalyst heater battery to the catalyst heater of the exhaust purifier, so that the catalyst of the purifier can be heated by the heater for activation of the catalyst at any time. Accordingly, if the storage amount of the vehicle drive battery is reduced, it is possible to charge the vehicle drive battery in a state where the purifying effect of the exhaust gas purifier can be fully exhibited. Thus, no exhaust gas containing pollutant or noxious gases is discharged during the battery charging, so that the exhaust gas purifying performance of the hybrid car can be improved. Moreover, the storage amount of the vehicle drive battery can be increased by charging the same battery, so that the drive performances of the vehicle can be improved and the cruising range thereof can be increased.

DETAILED DESCRIPTION

Figure 1:
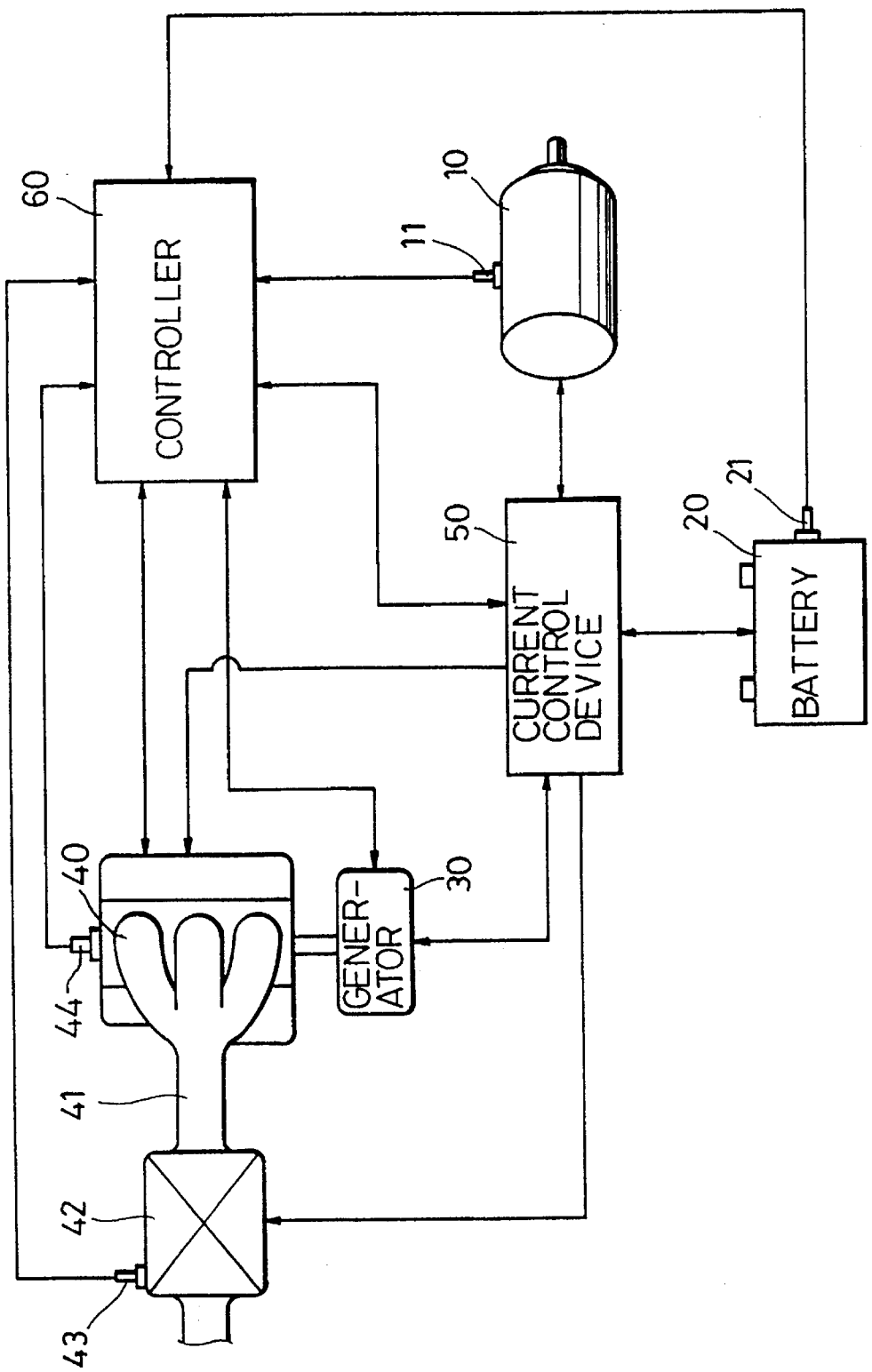
FIG. 1 is a schematic view showing the principal part of a hybrid car to which is applied an operating method for an internal combustion engine for power generation according to a first embodiment of the present invention.

Referring to FIG. 1, a hybrid vehicle is provided with a certain number of electric motors (one of which is denoted by numeral 10) depending on its specifications. The electric motor 10, which is used as a drive source for the vehicle, is formed of a DC or AC motor, and its output shaft is operatively connected to driving wheels (not shown) of the vehicle through a power transmission mechanism (not shown) of the vehicle. The motor 10 is connected electrically to a battery 20 through a current control device 50 which operates under the control of a controller 60. While the vehicle is running, the motor 10 normally drives the vehicle as it receives power supply from the battery 20. When the vehicle in decelerating operation, the motor 10 functions as an electric generator to generate deceleration recovery power, with which the battery 20 is charged. Further, the electric motor 10 is fitted with a motor temperature sensor 11 for detecting the motor temperature. Also, the battery 20 is fitted with a battery capacity sensor 21 for detecting a parameter indicative of the battery capacity, e.g., battery voltage value.

The hybrid vehicle is further provided with an electric generator 30 for generating electric power for battery charging, and an internal combustion engine 40 having an output shaft operatively connected to the generator shaft and serving to drive the generator 30. The generator 30, which is formed of a DC or AC generator, is connected electrically to the battery 20 through the current control device 50. Thus, the battery 20 is charged with electric power generated by the generator 30 during the operation of the engine 40. Further, the generator 30 is furnished with a control section (not shown), used to adjust the quantity of generated power and stop power generation, and various sensors (not shown) for detecting generator operation information, including the temperature, failed state, etc. of the generator. At the start of the engine operation, the generator 30 functions as a so-called starter which starts the internal combustion engine 40 when supplied with electric power from the battery 20. Alternatively, an engine starter may be provided separately from the generator 30. In this case, the generator 30 is used for power generation only.

The internal combustion engine 40 for power generation includes an engine body, formed of, e.g., a small lightweight piston engine, and an engine drive system (not shown). The engine drive system includes a fuel supply system having a throttle valve, an ignition system, a fuel injection system, and various actuators connected electrically to the current control device 50, and is used for start and stop of the engine, engine speed control, throttle valve opening control, etc. An exhaust gas purifier 42 is attached to an exhaust pipe 41 which is connected to an exhaust port (not shown) of the engine 40 and is used to discharge exhaust gas. The exhaust gas purifier 42 is composed of a catalyst for removing pollutant or noxious gases, such as CO, $NO_x$, etc., from the exhaust gas passing through the exhaust pipe 41, and an electrically-heated catalyst heater which is connected to the battery 20 through the current control device 50. When the catalyst is heated to be activated by means of the heater, it can produce a very strong exhaust gas purifying effect. The exhaust gas purifier 42 is fitted with a catalyst temperature sensor 43 for detecting the catalyst temperature. Further, the engine 40 is provided with various sensors (not shown) for detecting engine operation information, including the engine speed, air intake, throttle valve opening, etc. Reference numeral 44 denotes a water temperature gauge for detecting the temperature of engine cooling water as a parameter representing the engine temperature. Alternatively, an oil temperature gauge may be used in place of the water temperature gauge.

The current control device 50, which is located among the electric motor 10, battery 20, generator 30, internal combustion engine 40, and the catalyst heater of the exhaust gas purifier 42, as described above, serves to switch the electrical connections between the corresponding ones of the aforesaid elements under the control of the controller 60, and to adjust the current value and direction of the power supply between the corresponding elements. The control device 50 includes, for example, an input section (not shown) for receiving current control device control signals from the controller 60, an adjustment section (not shown) which operates in response to a control output from the input section for electrical connection switching and adjustment of current value and direction, and a power converter section (not shown) which operates in response to a control output from the adjustment section. The current control device 50 is provided with various sensors (not shown) for detecting the temperature, failed state, etc. of the device 50.

The controller 60 receives various kinds of operation information from the various components of the hybrid vehicle and the sensors, and controls the operations of the electric motor 10, internal combustion engine 40, and current control device 50. The controller 60 includes, for example, a processor (not shown) for executing control programs, which will be mentioned later, memories (not shown) for storing the control programs, various data, etc., and interface circuits (not shown) for signal transfer between the controller 60 and the aforesaid various components and sensors.

Specifically, the controller 60 is connected electrically to the motor temperature sensor 11 attached to the electric motor 10, the battery capacity sensor 21 attached to the battery 20, the catalyst temperature sensor 43 attached to the exhaust gas purifier 42, and the various sensors attached individually to the generator 30, internal combustion engine 40, and current control device 50. Also, the controller 60 is connected electrically to various sensors (not shown) which are arranged in the hybrid vehicle and used to detect vehicle operation information, such as the vehicle velocity, depth of accelerator pedal depression, etc. The controller 60 receives from these sensors a motor temperature signal, battery capacity signal, catalyst temperature signal, engine water temperature signal, generator operation information (e.g., temperature and failed state of the generator 30), internal combustion engine operation information (e.g., rotation speed, air intake, and throttle valve opening of the engine 40), current control device operation information (e.g., failed state of current control device 50), and vehicle operation information. Based on the various signals and information thus received, the controller 60 sets generator control signals associated with the control of the generator 30 for the quantity of generated power, suspension of the power generation, etc., internal combustion engine control signals associated with the control of the internal combustion engine 40 for its starting, stopping, speed, etc., and the current control device control signals associated with the control of the current value, current supply direction, etc. for the power supply between the aforesaid components which are connected to the current control device 50. The controller 60 delivers these set control signals to the generator 30, engine 40, and current control device 50.

Referring now to FIGS. 2 to 8, operation control of the electric motor 10, internal combustion engine 40, and exhaust gas purifier 42 by means of the controller 60 will be described.

Figure 2:
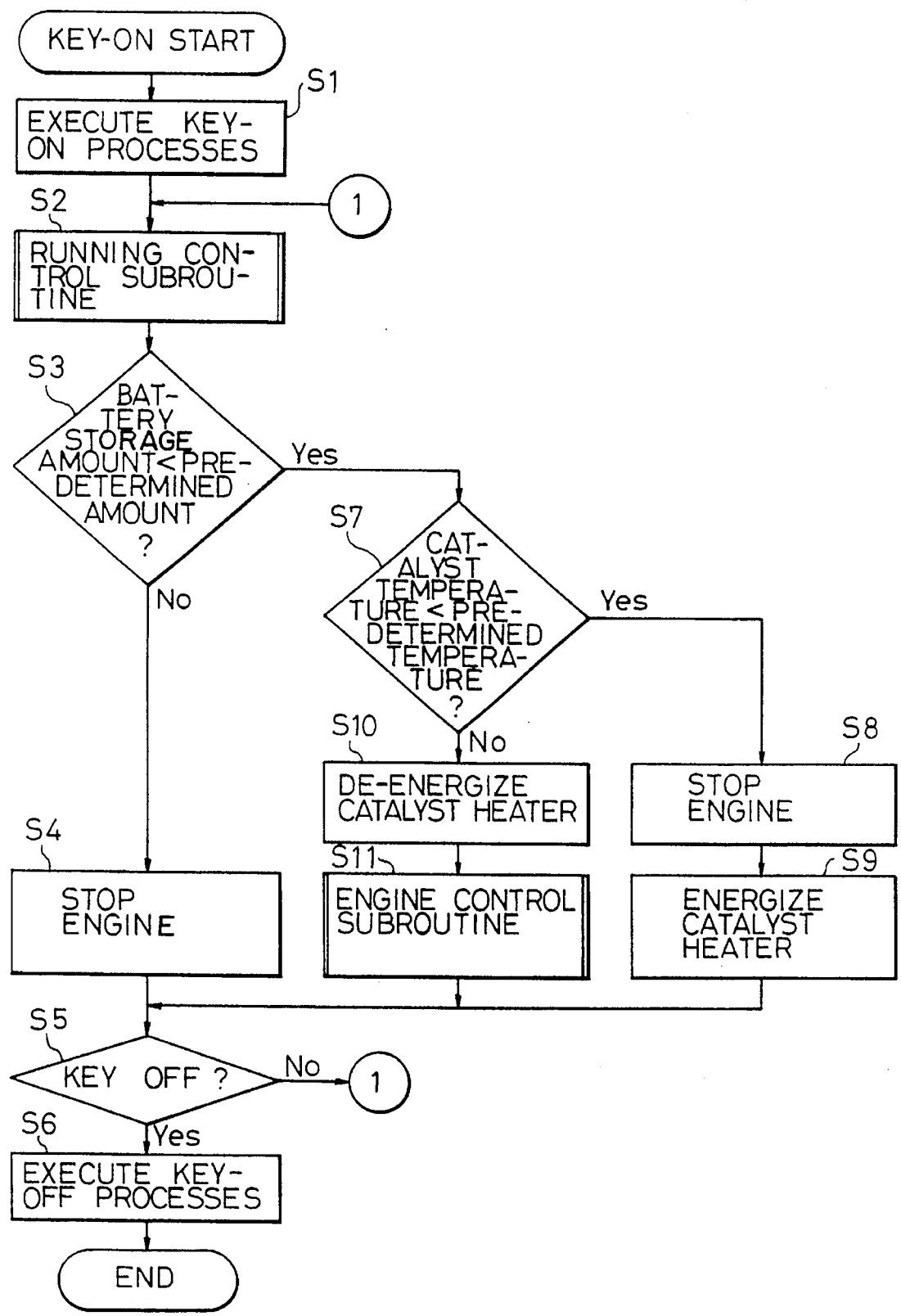
FIG. 2 is a flow chart illustrating a main routine for operation control of an electric motor for vehicle drive, internal combustion engine for power generation, and catalyst heater executed by a controller shown in FIG. 1.

When a driver turns on a starter key to actuate the vehicle, the processor of the controller 60 discriminates the key-on operation, and starts executing a main routine shown in FIG. 2. More specifically, the processor first executes key-on processes, including reading control data, backed up at the end of the preceding vehicle running cycle, from the memories, checking the operating conditions of the various components of the hybrid vehicle, etc. (Step S1), and then executes a running control subroutine shown in detail in FIG. 3 (Step S2).

Figure 3:
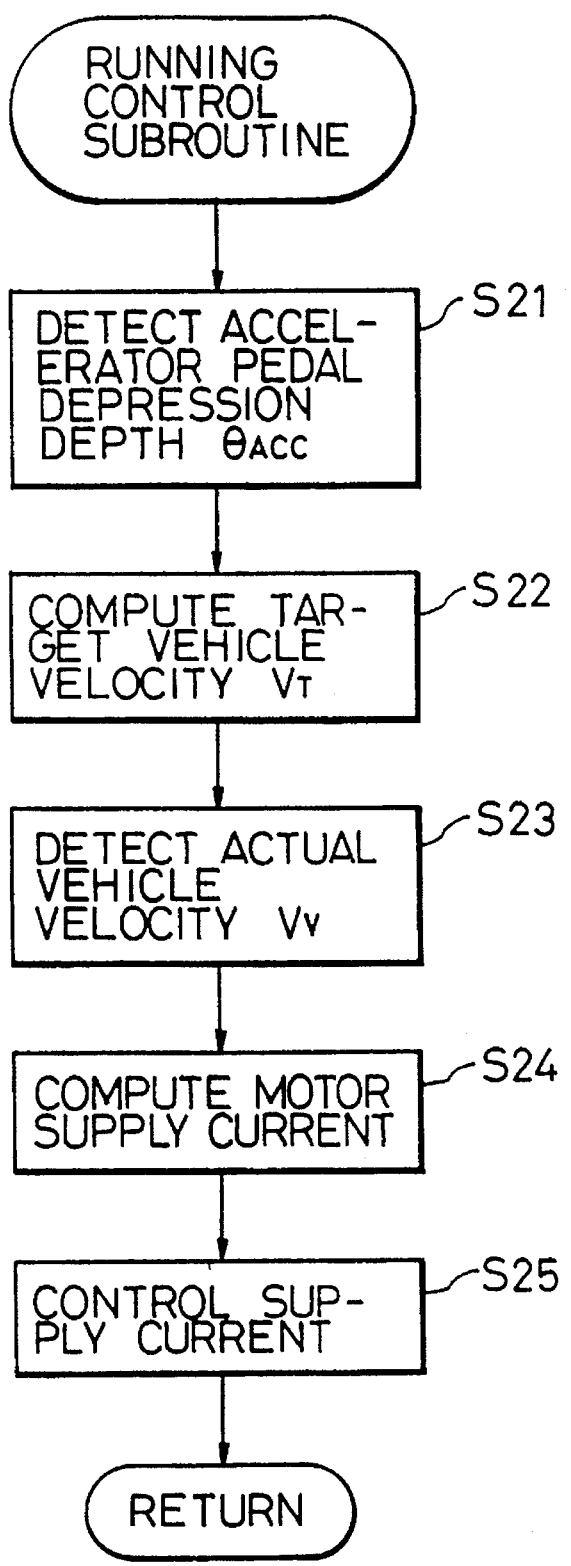
FIG. 3 is a flow chart illustrating the detail of a running control subroutine shown in FIG. 2.

In the running control subroutine shown in FIG. 3, the processor first detects an accelerator pedal depression depth $\theta_{ACC}$ by reading the output of an accelerator pedal depression depth sensor (Step S21), and then obtains a target vehicle velocity $V_T$, compatible with the depression depth $\theta_{ACC}$ detected in Step S21, in accordance with operational expressions or lookup tables for setting the target vehicle velocity (Step S22). The expressions or tables, which correspond to a characteristic curve (FIG. 5) indicative of the relationships between the accelerator pedal depression depth $\theta_{ACC}$ and the target vehicle velocity $V_T$, are previously described in the control programs or stored in the memories of the controller 60.

Figure 5:
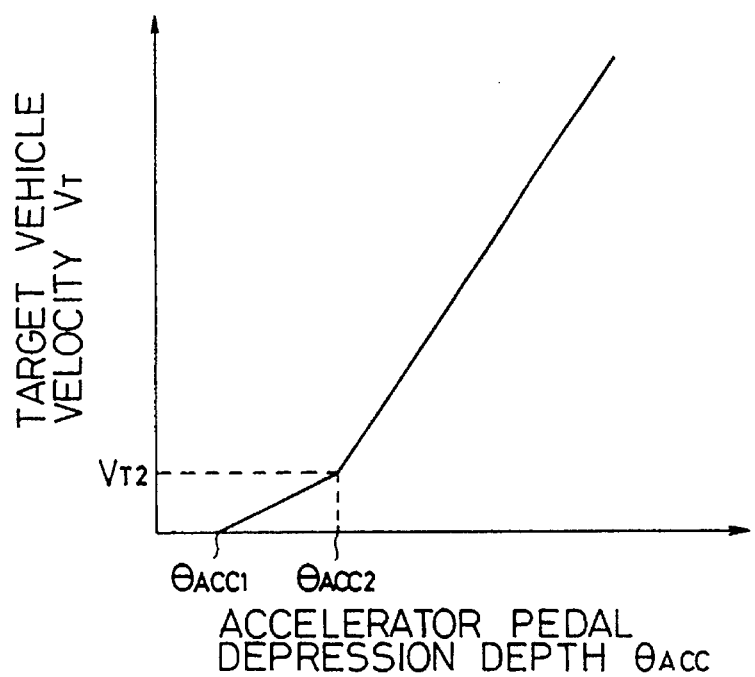
FIG. 5 shows a characteristic curve illustrating the relationships between the accelerator pedal depression depth ($\theta_{ACC}$) and target vehicle velocity ($V_T$) used in the running control subroutine.

As shown in FIG. 5, the target vehicle velocity $V_T$ is set so that it becomes zero to prevent the vehicle from starting running in a first depression depth region where the accelerator pedal depression depth $\theta_{ACC}$ takes a small value ranging from zero to $\theta_{ACC1}$, and increases from zero to $V_{T2}$ to allow the vehicle to start running slowly as the depression depth $\theta_{ACC}$ increases in a second depression depth region where the depression depth $\theta_{ACC}$ takes a relatively small value ranging from $\theta_{ACC1}$ to $\theta_{ACC2}$. In a third depression depth region where the depression depth $\theta_{ACC}$ exceeds $\theta_{ACC2}$, moreover, the target vehicle velocity $V_T$ increases from $V_{T2}$, at a rate higher than the increasing rate for the second region, to allow normal vehicle running as the depression depth $\theta_{ACC}$ increases.

Referring again to FIG. 3, the processor of the controller 60 reads the output of a vehicle velocity sensor to detect an actual vehicle velocity $V_V$ (Step S23) after setting the target vehicle velocity $V_T$, and then computes a motor current supply (required motor driving current amount) I (Step S24). In computing the motor current supply I, the processor first calculates a vehicle velocity difference $(=V_V-V_T)$ on the basis of the actual vehicle velocity $V_V$ detected in Step S23 and the target vehicle velocity $V_T$ set in Step S22, and then sets a required vehicle body acceleration $\alpha$, which is compatible with the previously detected actual vehicle velocity $V_V$ and the previously calculated vehicle velocity difference $(=V_V-V_T)$, in accordance with operational expressions or lookup tables for setting the required vehicle body acceleration, which correspond to characteristic curves (FIG. 6) indicative of the relationships between the actual vehicle velocity, the vehicle velocity difference and the required vehicle body acceleration.

Figure 6:
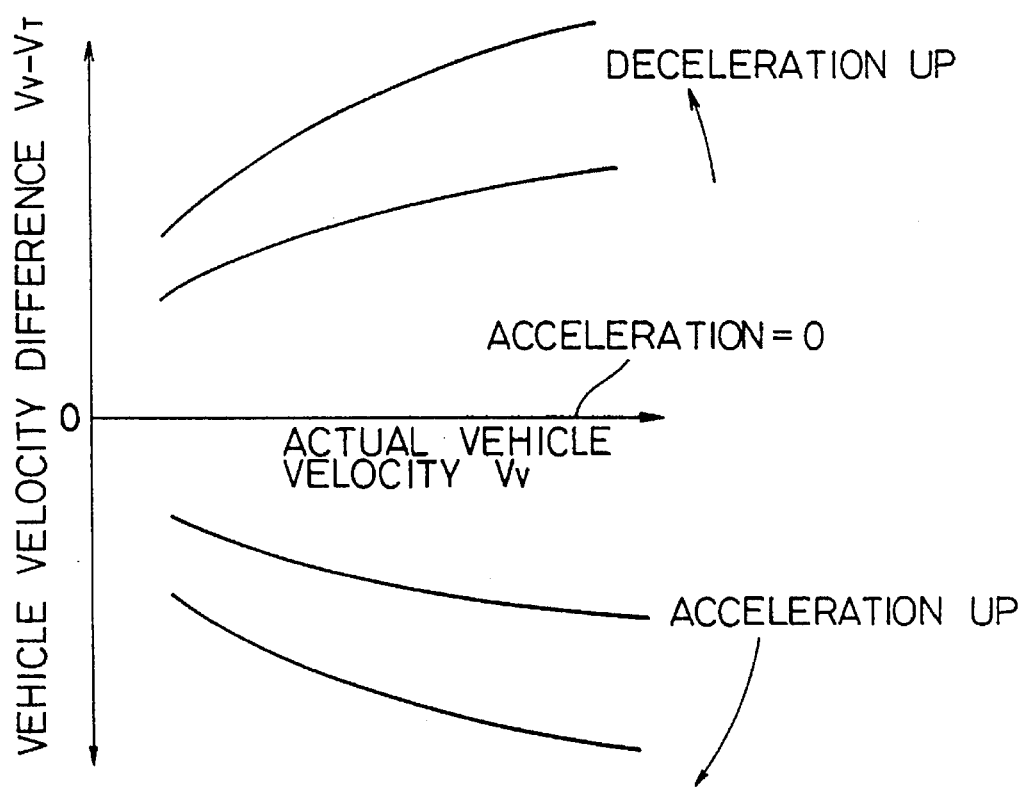
FIG. 6 shows characteristic curves illustrating the relationships between the actual vehicle velocity ($V_v$), vehicle velocity difference ($V_V-V_T$), and vehicle body acceleration ($\alpha$) used in the running control subroutine.

As shown in FIG. 6, the required vehicle body acceleration $\alpha$ takes a negative value, which is indicative of the necessity of decelerating operation of the vehicle, if the actual vehicle velocity $V_V$ is higher than the target vehicle velocity $V_T$, and therefore, the vehicle velocity difference is positive. If the vehicle velocity difference is negative, on the other hand, the acceleration $\alpha$ takes a positive value which is indicative of the necessity of accelerating operation. The absolute value of the acceleration $\alpha$ increases in proportion to the actual vehicle velocity even though the absolute value of the vehicle velocity difference is fixed.

After setting the required vehicle body acceleration $\alpha$ in this manner, the processor computes a required motor output $P_s$ in accordance with an operational expression, $P_s = [\{C \cdot A \cdot (V_V)^2 + \mu \cdot W + \alpha \cdot W/g\} \cdot V_V]/(K1 \cdot \eta)$, where C, A, $V_V$, $\mu$, W, $\alpha$ and $\eta$ are the air resistance, front projected area, actual velocity, rolling coefficient of resistance, overall weight, required body acceleration, and power transmissibility, respectively, of the vehicle. Further, g and K1 are the acceleration of gravity and unit conversion factor respectively, and the factor K1 is adjusted to, e.g., 270. The above operational expression is adapted for the case where the road has no gradient. Instead of making the computation according to this expression, in setting the required motor output, a lookup table for setting the motor output may be used for reference.

Then, the processor computes the required driving current value (motor current supply) I in accordance with an operational expression, $I=(K2 \cdot P_s)/(\eta_{MTR} \cdot V)$, where K2, $P_s$, $\eta_{MTR}$ and V are a unit conversion factor, required motor output, motor efficiency of the motor 10, and motor operating voltage of the motor 10, respectively, and the factor K2 is adjusted to, e.g., 735.

In Step S25, the processor delivers a control signal indicative of the required motor driving current value I to the current control device 50. In response to this control signal, the control device 50 performs, for example, duty control such that a motor driving current of the value I is supplied from the battery 20 to the electric motor 10 through the device 50. As a result, the actual vehicle velocity $V_V$ increases or decreases to or kept at the value of the target vehicle velocity $V_T$. If the accelerator pedal depression depth is greater than the value $\theta_{ACC1}$ immediately after the starter key is turned on, therefore, the motor 10 is actuated to allow the vehicle to start running.

Referring again to FIG. 2, the processor of the controller 60 reads the battery capacity signal from the battery capacity sensor 21 after the running control subroutine (Step S2) is finished, and determines, in accordance with the read signal, whether or not the storage amount of the battery 20 is smaller than a predetermined necessary amount for the electric motor 10 to cause the vehicle to run satisfactorily (Step S3). If the result of decision in this step is NO, that is, if the battery storage amount is not smaller than the predetermined storage amount so that the battery 20 need not be charged, the processor delivers an internal combustion engine control signal for an instruction to stop the internal combustion engine 40 to the engine drive system (Step S4). As a result, the engine 40 is kept in a stopped state when its operation is suspended, and the engine operation is stopped when the engine is operating. Thus, exhaust gas can be prevented from being produced by useless engine operation.

In Step S5, the processor determines whether the starter key is turned off or not. If the result of decision in this step is NO, the processor returns to the aforesaid running control subroutine (Step S2). If it is concluded that the starter key is turned off, on the other hand, the processor executes key-off processes, including writing control data in a backup memory, checking the operating conditions of the various components of the hybrid car, etc. (Step S6), whereupon the main routine is finished.

The battery storage amount may become smaller than the predetermined amount while the aforementioned series of processes of Steps S2 to S5 is repeated without turning off the starter key so that the required driving current is supplied to the electric motor 10 as the vehicle runs. In this case, the battery 20 must be charged. If it is concluded in Step S3 that the battery charging is necessary, the processor reads the catalyst temperature signal from the catalyst temperature sensor 43, and determines, in accordance with the read signal, whether or not the catalyst temperature is lower than a predetermined necessary temperature for satisfactory activation of the catalyst (Step S7). If the result of decision in this step is YES, and therefore, exhaust gas containing pollutant or noxious gases may possibly be discharged from the internal combustion engine 40 when the engine is operated, the processor delivers the engine control signal for the instruction to stop the engine to the engine drive system (Step S8), thereby maintaining the stopped state of the engine 40 or stopping the engine operation when the engine is operating. Thus, if the catalyst temperature lowers from any cause during the engine operation, the engine operation is stopped.

In Step S9, the processor delivers a control signal for an instruction for current supply to the catalyst heater of the exhaust gas purifier 42 to the current control device 50. In response to this control signal, the current control device 50 operates so that a heating current is supplied from the battery 20 to the heater. Accordingly, the heater is energized to heat the catalyst. After the instruction for the current supply to the heater is given, the processor determines again whether the starter key is turned off or not (Step S5). If the key is not turned off, the processor returns to Step S2, and then repeatedly executes the aforesaid series of processes of Steps S2, S3, S7, S8, S9 and S5.

If it is concluded in Step S7, thereafter, that the catalyst temperature reached to a predetermined temperature, and therefore, the exhaust gas purifier 42 is in an operating state such that the pollutant or noxious gases can be removed from the exhaust gas by the exhaust gas purifying effect of the catalyst, the processor delivers a control signal for an instruction to stop the current supply to the catalyst heater to the current control device 50 (Step S10). As a result, the current supply to the heater is stopped. Then, the processor executes an engine control subroutine shown in detail in FIG. 4 (Step S11).

Figure 4:
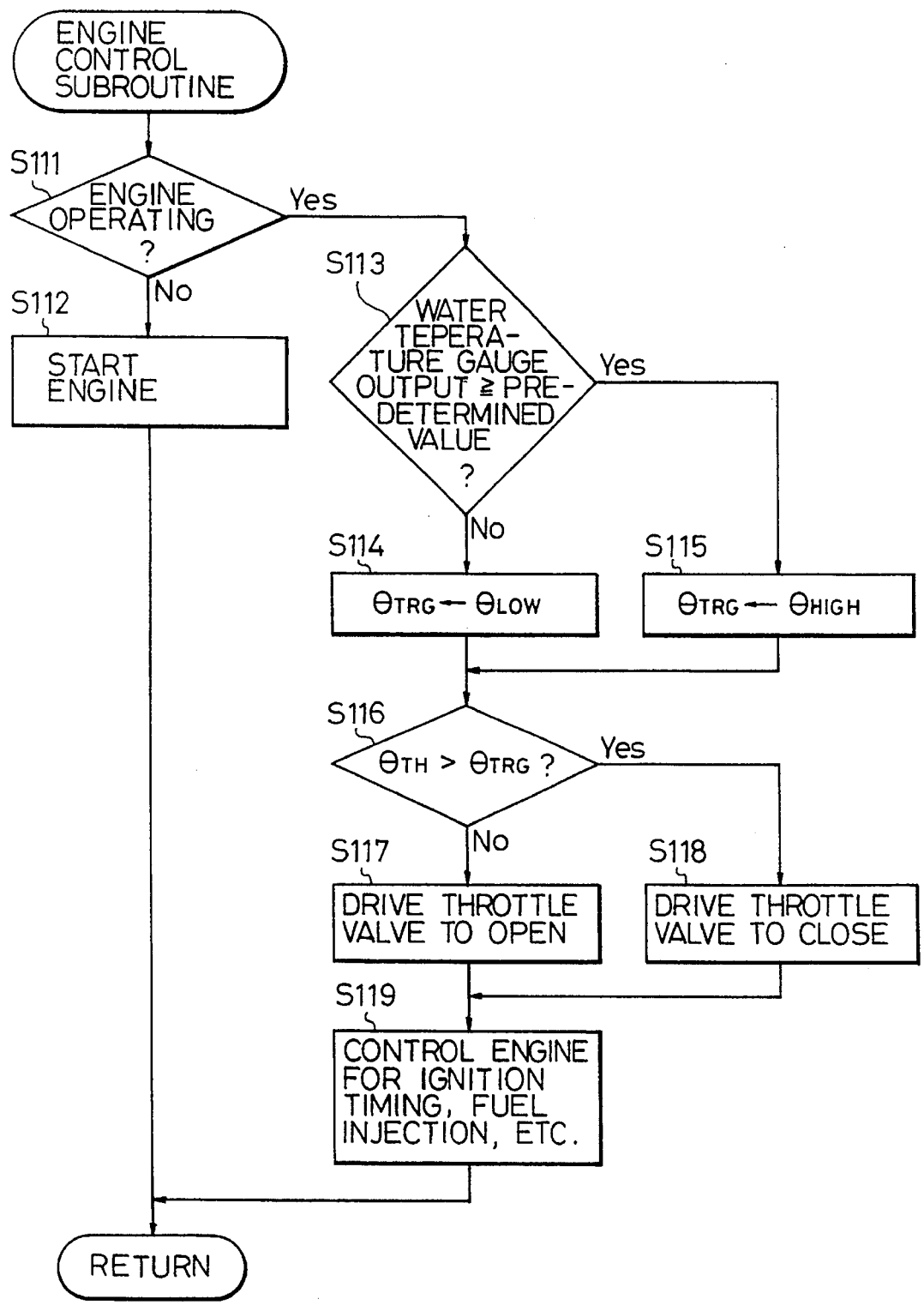
FIG. 4 is a flow chart illustrating the detail of an engine control subroutine shown in FIG. 2.

In the engine control subroutine shown in FIG. 4, the processor determines whether the internal combustion engine 40 is operating or not, with reference to the contents of the memories of the controller 60 which indicate whether an engine control signal for an instruction to operate the engine is delivered or not (Step S111). If the result of decision in this step is NO, the processor delivers a current control device control signal for an instruction to start the engine to the current control device 50 (Step S112). As a result, the control device 50 operates so that a required driving current is supplied from the battery 20 to the starter (generator 30) through the device 50. Accordingly, the internal combustion engine 40 is started by means of the generator 30 which serves as the starter. As a result, warm-up operation of the engine 40 is started.

In Step S5 of the main routine (FIG. 2) which follows the engine control subroutine, it is determined again whether the starter key is turned off or not. If the result of decision in this step is YES, the key-off processes are executed in Step S6, whereupon the execution of the main routine is finished. If it is concluded in Step S5 that the starter key is not off, the process of Step S2 (running control subroutine) and the subsequent processes are executed again in the aforesaid manner. Since the internal combustion engine 40 is already started in the previous engine control subroutine, it is concluded in Step S111 of the engine control subroutine (Step S11), executed again following the series of processes of Steps S2, S3, S7 and S10, that the engine is operating.

In this case, the processor of the controller 60 reads the output of the water temperature gauge 44, i.e., the engine water temperature signal, and a predetermined value of engine cooling water temperature, which is set beforehand and represents a state of the engine 40 in which warm-up operation is completed, from the memory of the controller 60, and then determines whether the output of the water temperature gauge takes a value greater than or equal to the predetermined value (Step S113). If the result of decision in this step is NO, that is, if the warm-up operation of the engine 40 is not yet completed, the processor sets a target throttle valve opening $\theta_{TRG}$ to a first predetermined opening $\theta_{LOW}$ for carrying out the warm-up operation of the engine 40 (Step S114). The first predetermined opening $\theta_{LOW}$ is preset to a small value such that the warm-up operation of the engine is carried out in an engine operation region in which both the engine load and the engine rotation speed are low, for example, in an idle operation region.

If the result of decision in Step S113 is YES, that is, if it is concluded that the warm-up operation of the engine is completed, the target throttle valve opening $\theta_{TRG}$ is set to a second predetermined opening $\theta_{HIGH}$ for operating the engine for the battery charging (Step S115). Accordingly, when completion of the warm-up operation is discriminated for the first time, engine operation for causing the generator 30 to effect power generation is started. The second predetermined opening $\theta_{HIGH}$ is set to a value greater than the first predetermined opening $\theta_{LOW}$, and therefore, the engine operation for power generation is carried out in a region wherein the engine load and the engine rotation speed are greater than those during the warm-up operation. During the engine operation for power generation, the processor supplies a generator control signal indicating an amount of power to be generated to a generator control section, and a current control device control signal for an instruction to charge the battery with generated power to the current control device 50.

The processor further detects a present actual throttle valve opening $\theta_{TH}$ on the basis of the output of the throttle valve opening sensor, and then determines whether the detected present throttle opening $\theta_{TH}$ exceeds the target throttle valve opening $\theta_{TRG}$ set in Step S114 or S115 (Step S116). If the result of decision in this step is NO, the processor delivers an engine control signal for an instruction to actuate the throttle valve in a direction to open the same to the engine drive system (Step S117). If, on the other hand, it is concluded in Step S116 that the present throttle valve opening $\theta_{TH}$ is greater than the target throttle valve opening $\theta_{TRG}$, the processor delivers an engine control signal for an instruction to actuate the throttle valve in a direction to close the same to the engine drive system (Step S118). As a result, the throttle valve of the internal combustion engine 40 is opened or closed to the target throttle valve opening $\theta_{TRG}$ by the throttle valve actuating mechanism, in accordance with the result of decision in Step S96, and the engine 40 is operated with the throttle valve opening thus set.

Then, in Step S119, which is executed following Step S117 wherein the throttle valve is actuated toward the open position, or Step S118 wherein the throttle valve is actuated toward the closed position, normal engine controls including ignition timing control, fuel injection control, etc. are carried out, whereupon the engine control subroutine is finished and the flow returns to the main routine. During the warm-up operation of the engine, the fuel injection control is carried out in Step S119 such that the air-fuel ratio of a mixture supplied to the engine 40 becomes close to a stoichiometric ratio, whereby the exhaust gas purifier 42 can provide a satisfactory purifying effect during the warm-up operation and a lowering of the emission characteristics is reduced when the engine is in a cool state.

When it is concluded in Step S5 of the main routine that the starter key is not turned off, the flow returns to Step S2 (running control subroutine). On the other hand, if It is concluded that the starter key is off, the aforementioned key-off processes are executed (Step S6), and the execution of the main routine is finished.

The following is a summary of the above-described operation control of the various components of the hybrid car by means of the controller 60. When the starter key is turned on, computation of the current supply to the electric motor 10 and control of the motor current supply are started, and this motor control is carried out periodically, thereafter. As a result, the hybrid vehicle, which uses the motor 10 as its drive source, runs. If the storage amount of the battery 20 is sufficient while the vehicle is running, the operation of the internal combustion engine 40 for driving the generator 30 is stopped, so that unnecessary discharge of exhaust gas can be prevented. If there is a possibility of the battery storage amount becoming insufficient, the engine 40 is started to cause the generator 30 to generate electric power, so that the battery 20 is charged with the generated power. If the catalyst temperature measured before starting the engine operation is lower than the necessary temperature for the activation of the catalyst, the catalyst heater is energized to heat the catalyst. When the activation of the catalyst is complete, the engine 40 is warmed up in an idling state, while controlling the fuel supply to the engine 40 such that the air-fuel ratio of the mixture becomes close to the stoichiometric ratio, for example. When it is concluded based on the output of the water temperature gauge that the warm-up operation is completed, the engine 40 is operated for the power generation, with the engine load and the engine rotation speed maintained at increased values. Namely, the engine operation for power generation is started when both the activation of the catalyst and the warm-up operation of the engine are completed, whereby the battery is charged. Since such battery charging is carried out every time the vehicle runs, the power supply from the battery 20 alone can normally enable the vehicle to run before heating the catalyst is completed after the start of the vehicle running. When the catalyst heating is completed, the battery can be charged as required. Normally, therefore, the hybrid vehicle never finds it difficult to run in the course of its running. When the starter key is turned off thereafter, the aforementioned motor control is terminated and the vehicle running by means of the electric motor 10 is stopped. If the engine is operating when the starter key is turned off, the engine control is terminated at the same time that the starter key is turned off, and therefore, the power generation by the engine is stopped.

An operating method for a hybrid vehicle according to a second embodiment of the present invention will be now described.

Figure 7:
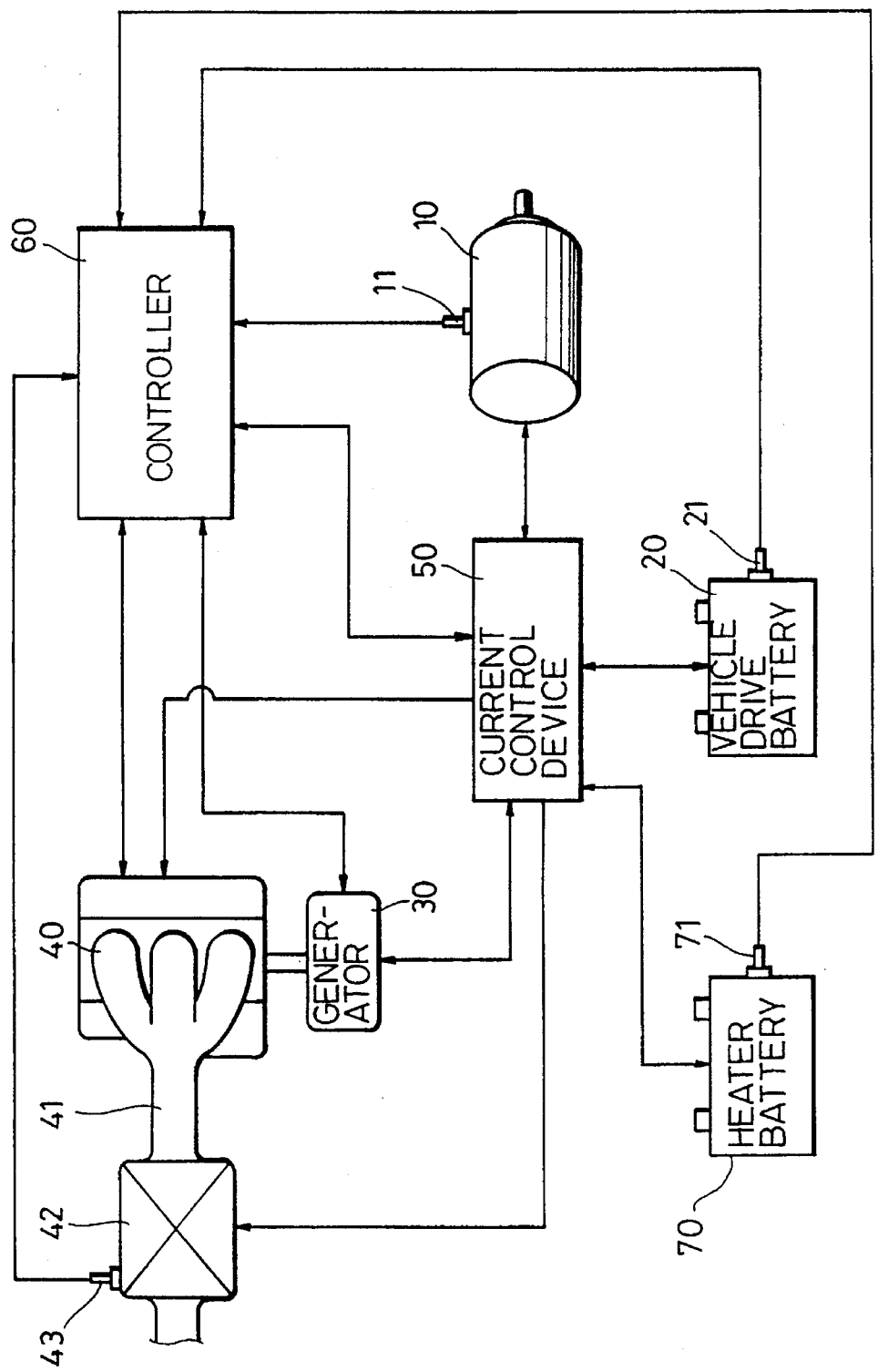
FIG. 7 is a schematic view showing the principal part of a hybrid car to which is applied an operating method for an internal combustion engine for power generation according to a second embodiment of the invention.

As shown in FIG. 7, the hybrid vehicle to which the method according to this embodiment is applied is characterized in that it has a battery (second battery) 70 for the heater, in addition to the battery (first battery) 20 for vehicle drive. For other parts, this hybrid car has an arrangement identical with that of the hybrid car shown in FIG. 1, and therefore, explanation of the arrangement and operation of the hybrid car is partly omitted.

The second battery serves to supply electric power to the catalyst heater through the current control device 50, and is charged with electric power supplied from the generator 30 through the current control device 50. A second battery capacity sensor 71, similar to the first battery capacity sensor 21, is attached to the second battery 70 and connected to the controller 60.

Figure 8:
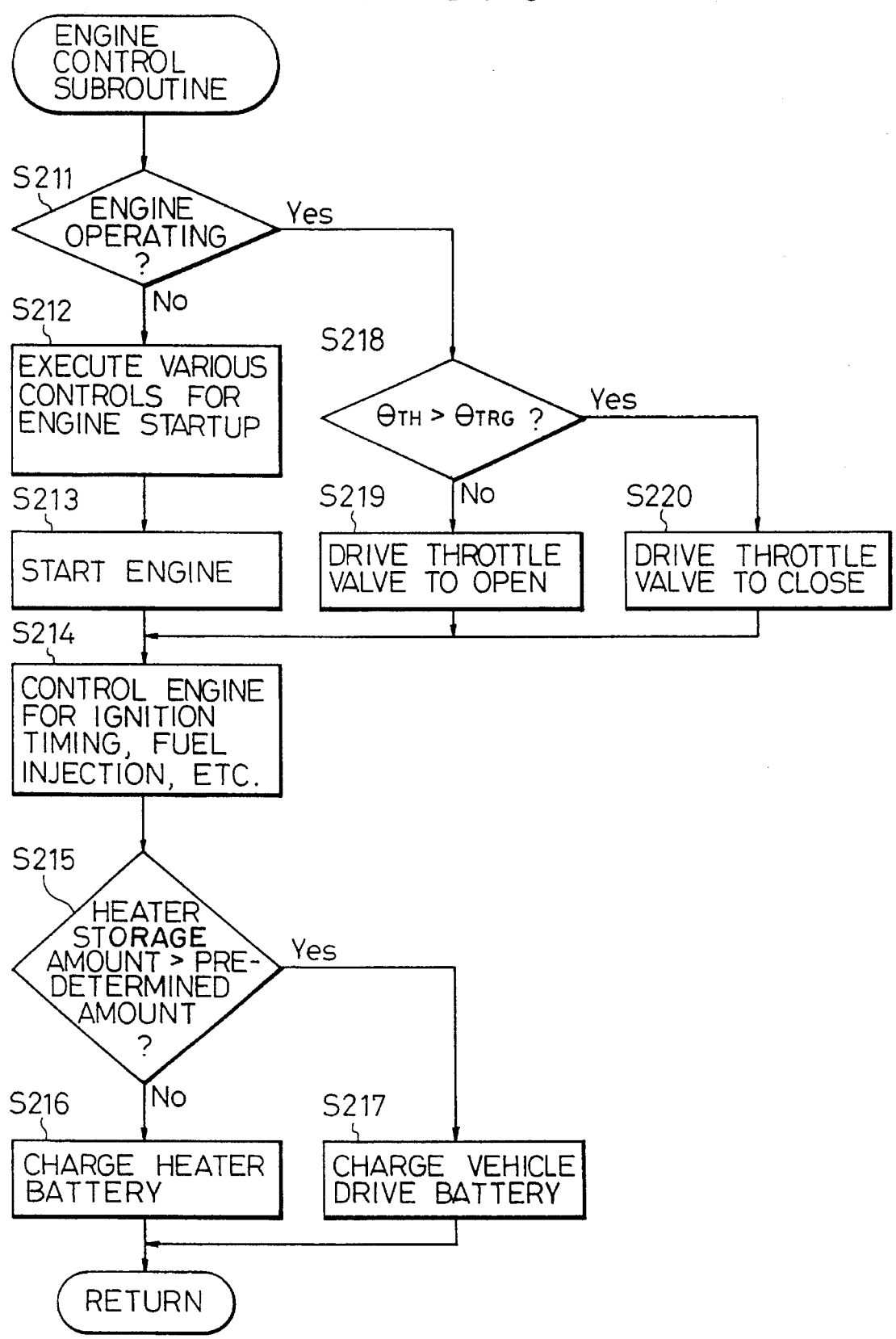
FIG. 8 is a flow chart showing the detail of an engine control subroutine according to the second embodiment.

The operation control for the electric motor 10, internal combustion engine 40, and exhaust gas purifier 42, executed by the controller 60, will be described. The control method according to this embodiment is executed basically in the same manner as in the first embodiment, in accordance with the main routine shown in FIG. 2 and the running control subroutine shown in FIG. 3. However, as shown in FIG. 8, the engine control subroutine differs from that shown in FIG. 4. Accordingly, detailed description will be made only with regard to the engine control subroutine.

In the engine control subroutine shown in FIG. 8, the processor determines whether the internal combustion engine 40 is operating, with reference to the contents of the memories of the controller 60 representing whether an engine control signal for an instruction for engine operation has been delivered (Step S211). If the result of decision in this step is NO, the processor carries out various controls for engine start (Step S212).

For example, the processor delivers a current control device control signal for an instruction to start a fuel pump (not shown) to the current control device 50. Also, the processor delivers an engine control signal for an instruction to actuate the throttle valve by a required angle in a required direction as determined by a current throttle valve opening obtained based on the output of a throttle valve opening sensor and a predetermined throttle valve opening for engine startup, to a throttle valve actuating mechanism of the engine drive system including a pulse motor, for example. As a result, the current control device 50 operates such that a required driving current is supplied from the first battery 20 or the second battery 70 to a fuel pump drive motor (not shown) through the current control device 50, thereby starting the fuel pump, and the throttle valve is positioned at a predetermined angular position for engine startup.

Then, the processor delivers a current control device control signal for an instruction to start the engine to the current control device 50 (Step S213). As a result, the control device 50 operates so that a required driving current is supplied from the first battery 20 or the second battery 70 to the starter (generator 30) through the device 50. Accordingly, the internal combustion engine 40 is started by means of the generator 30 which serves as the starter. Thus, the generator 30 is driven by the engine 40 to start the power generation.

After the engine is started, the processor carries out normal engine controls, including ignition timing control, fuel injection control, etc. (Step S214), and then determines whether the storage amount of the second battery 70 is greater than a predetermined storage amount necessary to supply required electric power to the catalyst heater (Step S215). If the result of decision in this step is NO, that is, if the storage amount of the second battery is smaller than the predetermined storage amount, the processor delivers a current control device control signal for an instruction to charge the second battery 70 to the current control device 50, and also delivers a generator control signal representing an amount of power to be generated to the generator control section. If it is concluded in Step S215 that the storage amount of the second battery is greater than the predetermined storage amount, the processor delivers a current control device control signal for an instruction to charge the first battery 20 and a generator control signal representing a power generation amount. Thus, even in the case where it is concluded in Step S3 of the main routine that the first battery 20 for vehicle drive need be charged, the second battery 70 for the catalyst heater is charged preferentially to the first battery 20 when the second battery 20 need be charged. Since the second battery 70 is preferentially charged, immediately after the vehicle starts running, it is normally concluded in Step S215 that the storage amount of the second battery is greater than the predetermined storage amount, and therefore, the first battery 20 is charged.

After the engine control subroutine is completed, it is again determined in Step S5 of the main routine (FIG. 2) whether the starter key is off. If the result of decision in this step is YES, the key-off processes are executed in Step S6, whereupon the execution of the main routine is terminated. If it is concluded in Step S5 that the starter key is not off, the process of Step S2 (running control subroutine) and the subsequent processes are executed again in the aforesaid manner. Since the internal combustion engine 40 is already started in the previous engine control subroutine, it is concluded in Step S211 of the engine control subroutine (Step S21), executed again following the series of processes of Steps S2, S3, S7 and S10, that the engine is operating.

In this case, the processor of the controller 60 reads out the preset target throttle opening $\theta_{TRG}$, detects the present throttle opening $\theta_{TH}$ based on the output of the throttle valve opening sensor, and then determines whether the present throttle valve opening $\theta_{TH}$ is greater than the target throttle valve opening $\theta_{TRG}$ (Step S218). If the result of decision in this step is NO, the processor delivers an engine control signal for an instruction to actuate the throttle valve in the direction to open the same, to the engine drive system (Step S219). If it is concluded in Step S218 that the throttle valve opening $\theta_{TH}$ is greater than the target throttle valve opening $\theta_{TRG}$, the processor delivers an engine control signal for an instruction to actuate the throttle valve in the direction to close the same, to the engine drive system (Step S220). As a result, the throttle valve of the internal combustion engine 40 is opened or closed by the throttle valve actuating mechanism, in accordance with the result of decision in Step S218. Then, in Step S214, which is executed following Step S219 wherein the throttle valve is actuated toward the open position, or Step S220 wherein the throttle valve is actuated toward the closed position, the aforementioned normal engine controls are carried out, and the first battery 20 or the second battery 70 is charged (Step S216 or S217).

On returning to the main routine after the engine control subroutine is finished, the key-off processes are carried out (Step S6) or the running control subroutine is executed (Step S2), in accordance with the result of decision in Step S5 of the main routine relating to the starter key position, as previously explained.

The following is a summary of the above-described operation control of the various components of the hybrid car by means of the controller 60. When the starter key is turned on, computation of the current supply to the electric motor 10 and control of the motor current supply are started, and this motor control is carried out periodically, thereafter. As a result, the hybrid vehicle, which uses the motor 10 as its drive source, runs. If the storage amount of the first battery 20 for vehicle drive is sufficient while the vehicle is running, the operation of the internal combustion engine 40 for driving the generator 30 is stopped, so that unnecessary discharge of exhaust gas can be prevented. If there is a possibility that the storage amount of the first battery 20, or the second battery 70 for the catalyst heater become insufficient, the engine 40 is started to cause the generator 30 to generate electric power, so that the battery 20 or 70 is charged with the generated power. In this case, the second battery 70 is preferentially charged. If the catalyst temperature measured before starting the engine operation is lower than the necessary temperature for the activation of the catalyst, the catalyst heater is energized to heat the catalyst. Since such battery charging is carried out every time the vehicle runs, the power supply from the first battery 20 alone can normally enable the vehicle to run before heating the catalyst is completed after the start of the vehicle running. If the storage amount of the first battery 20 is greatly reduced from any cause, the catalyst heater can always be supplied with electric power from the second battery to heat the catalyst since the storage amount of the second battery 70 is constantly maintained at a level above the predetermined storage amount. Accordingly, with the catalyst activated by heating, the first battery 20 can be charged as required, without discharging exhaust gas containing pollutant or noxious gases. Normally, therefore, no difficulty arises when running the hybrid vehicle. Thus, since the first battery 20 can be charged at any time, the storage amount of the first battery 20 can be maintained at a required amount, whereby the power performances of the vehicle using the electric motor as its drive source are improved and also the cruising range is increased.

When the starter key is turned off thereafter, the aforesaid motor control is terminated and the vehicle running by means of the electric motor 10 is stopped. If the engine is operating when the starter key is turned off, the engine control mentioned above is terminated at the same time that the starter key is turned off, thus stopping the engine operation.

The battery charging may be carried out using electric power supplied externally, instead of the electric power generated by the generator 30 driven by the engine 40. Also in such case, the second battery 70 is charged preferentially to the first battery 20, as in the case of charging the batteries with the generated power.

An operating method for a hybrid vehicle according to a third embodiment of the present invention will be now described.

Figure 9:
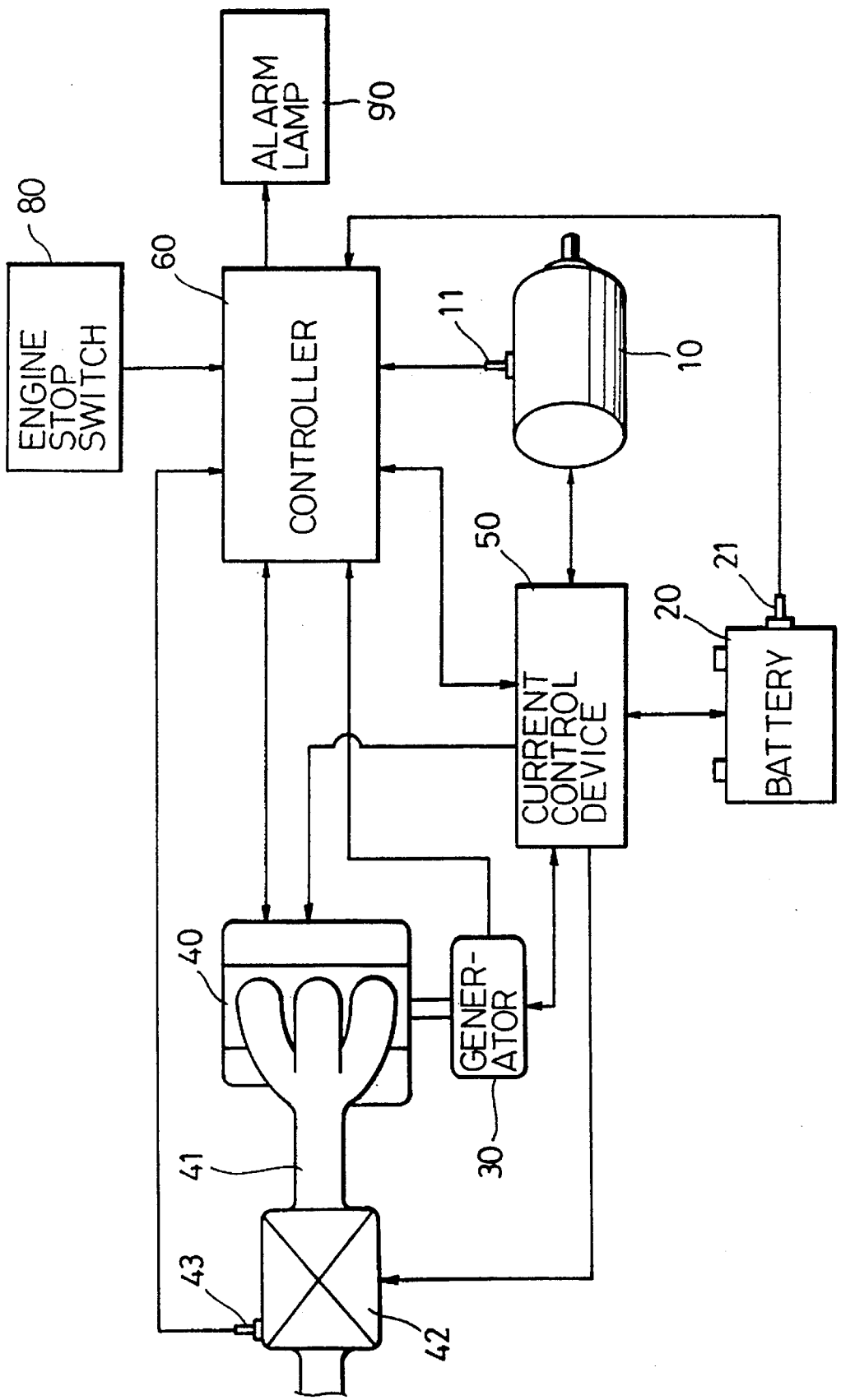
FIG. 9 is a schematic view showing the principal part of a hybrid car to which is applied an operating method for an internal combustion engine for power generation according to a third embodiment of the invention.

A major feature of the method according to this embodiment lies in that the battery charging is available even after the vehicle running is stopped. To this end, a hybrid vehicle to which the method of this embodiment is applied is provided with an engine stop switch 80 and an alarm lamp 90, as shown in FIG. 9, and the alarm lamp 90 serves to inform the driver that the engine 40 is operating for the battery charging after the vehicle running is stopped. The switch 80 and the lamp 90 are connected to the controller 60. Except for these features, the hybrid vehicle shown in FIG. 9 has a similar arrangement to that shown in FIG. 1, and therefore, description of the arrangement and operation of the hybrid vehicle is partly omitted.

The operation control for the electric motor 10, internal combustion engine 40, and exhaust gas purifier 42, executed by the controller 60, will be described. The control method according to this embodiment is executed basically in the same manner as in the first embodiment, in accordance with a main routine (FIG. 10) similar to that shown in FIG. 2 and the running control subroutine shown in FIG. 3. The main routine of FIG. 10 differs from that of FIG. 2 in that it does not have a step corresponding to Step S4 for the engine stop, and includes a key-off subroutine S305, in place of Step S6 for the key-off processes. Further, as seen from FIG. 11, the engine control subroutine (S310) differs from that shown in FIG. 4. Accordingly, the following description is focused on the key-off subroutine S305 and the engine control subroutine S310.

Figure 10:
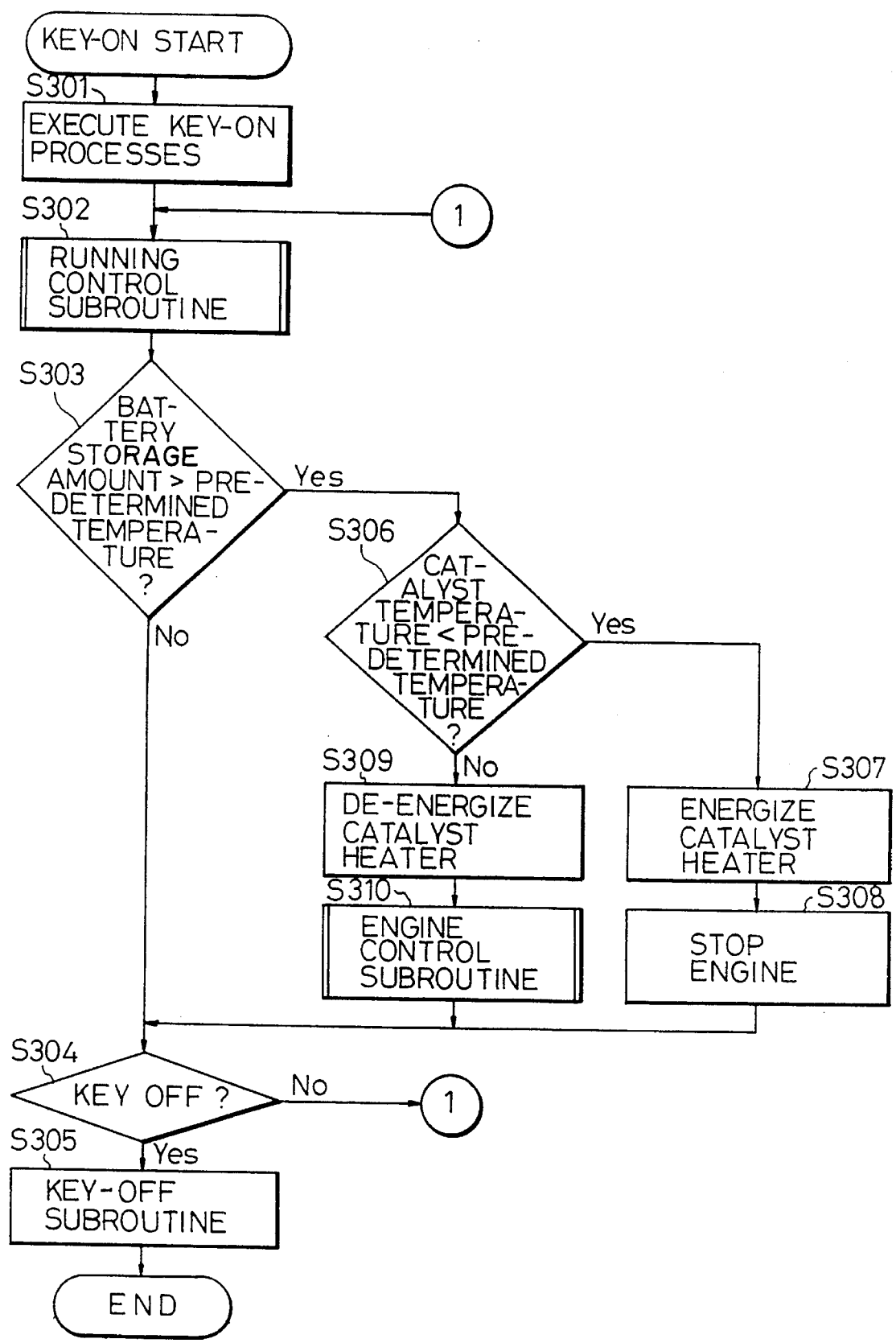
FIG. 10 is a flow chart of a main routine for controlling operations of an electric motor for vehicle drive, internal combustion engine for power generation, and catalyst heater according to the third embodiment.

In Step S303 of the main routine shown in FIG. 10, which is executed following Step S301 for the key-on processes and the running control subroutine S302, if it is concluded that the storage amount of the battery 20 is not smaller than the predetermined storage amount, the processor of the controller 60 determines whether the starter key is off (Step S304). If the result of decision in this step is NO, the program returns to the running control subroutine (Step S302). If, on the other hand, it is concluded that the starter key is off, the processor executes the key-off subroutine described in detail later (Step S305), and the main routine is finished.

While the vehicle is running thereafter, if it is concluded in Step S303 that the battery storage amount is smaller than the predetermined storage amount, and if it is concluded in the subsequent Step S306 that the catalyst temperature is lower than the predetermined temperature, the processor successively delivers a control signal for an instruction to supply current to the catalyst heater and an engine control signal for an instruction to stop the engine (Steps S307 and S308). As a result, the catalyst is heated and the operation of the internal combustion engine 40 is stopped. Then, if it is concluded in Step S304 that the starter key is not off, the program returns to Step S2.

If it is concluded thereafter in Step S306 that the catalyst temperature has reached the predetermined temperature, the processor delivers a control signal for an instruction to stop the current supply to the catalyst heater (Step S309), and executes the engine control subroutine (Step S310).

Figure 11:
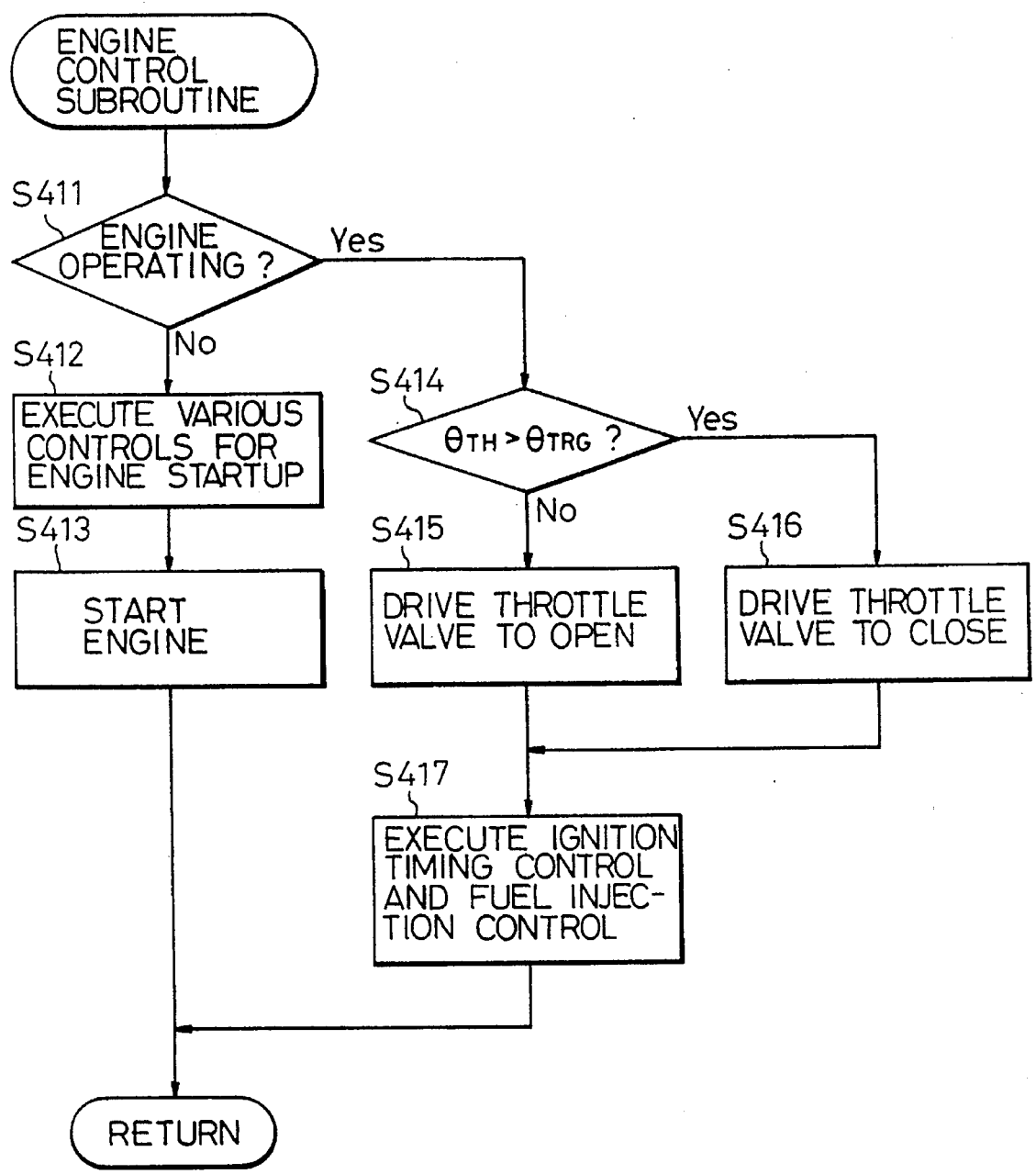
FIG. 11 is a flow chart showing the detail of an engine control subroutine shown in FIG. 10.

Referring now to the engine control subroutine shown in FIG. 11, if it is concluded in Step S411 that the internal combustion engine 40 is not operating, the processor carries out the various controls for engine startup in Step S412 corresponding to Step S212 in FIG. 8, and delivers a current control device control signal for an instruction to start the engine (Step S413). As a result, the generator 30 is driven by the engine 40 to start the power generation.

After the present cycle of the engine control subroutine is completed in this manner, if it is concluded in Step S304 of the main routine that the starter key is off, the key-off subroutine (Step S305) is executed. On the other hand, if it is concluded in Step S304 that the starter key is not off, the running control subroutine and the subsequent processes are executed, as described above. Since the internal combustion engine 40 is already started in the previous engine control subroutine, it is concluded in Step S411 of the engine control subroutine (Step S310) that the engine is operating.

In this case, the processor of the controller 60 determines whether the present throttle valve opening $\theta_{TH}$ is greater than the target throttle valve opening $\theta_{TRG}$ (Step S414). In accordance with the result of decision in this step, the processor delivers an engine control signal for an instruction to actuate the throttle valve so as to increase or decrease the valve opening (Step S415 or S416), whereby the throttle valve opening is controlled to the target opening $\theta_{TRG}$. The target opening $\theta_{TRG}$ is set to such a value that the engine 40 is operated in a high-efficiency operation region at a rotation speed of, e.g., about 3000 rpm. Then, in Step S417, which is executed following Step 415 or S416, the normal engine controls including ignition timing control, fuel injection control, etc. are carried out.

On returning to the main routine after the engine control subroutine is completed, the key-off subroutine (Step S305) or the running control subroutine (Step S302) is executed, in accordance with the result of decision in Step S304 of the main routine, as previously mentioned.

Figure 12:
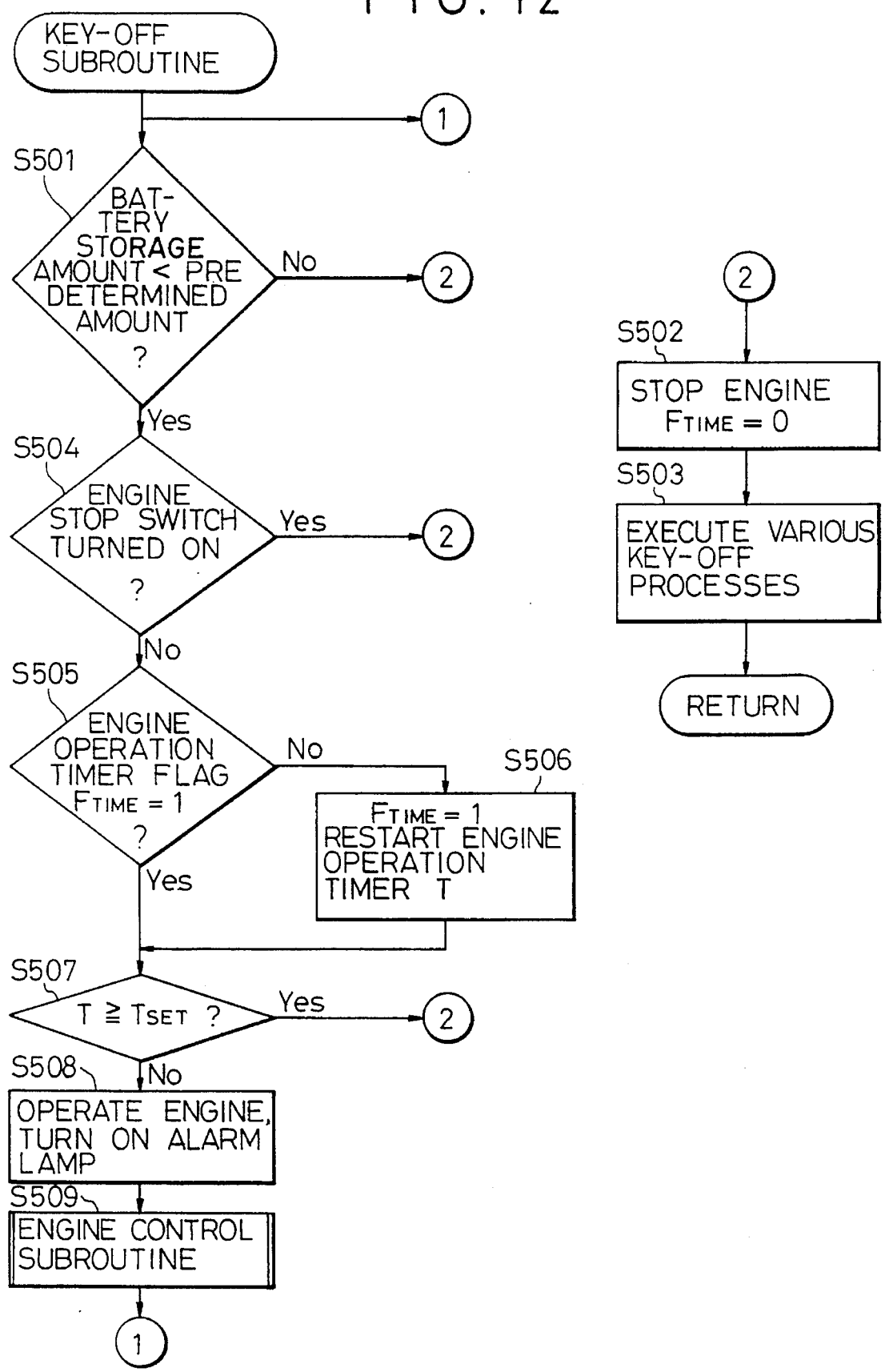
FIG. 12 is a flow chart showing the detail of a key-off subroutine shown in FIG. 10.

In the key-off subroutine shown in detail in FIG. 12, the processor first determines whether the storage amount of the battery 20 is smaller than the predetermined storage amount (Step S501). If the result of decision in this step is NO, that is, if the battery charging is not necessary, the processor delivers an engine control signal for an instruction to stop the internal combustion engine 40 to the engine drive system, and sets an engine operation timer flag $F_{TIME}$ to "0" which indicates that the engine operation time elapsed from a stoppage of the vehicle is not being measured (Step S502). As a result, the internal combustion engine 40 is held in a stopped state if the engine is already stopped, and the engine operation is stopped if the engine 40 is operating. Further, the processor executes the key-off processes, including writing of control data in the backup memories, checking of operating conditions of the various components of the hybrid vehicle, etc. (Step S503), whereupon the key-off subroutine is terminated.

If the result of decision in Step S501 is YES, that is, if the battery charging is necessary, the processor determines whether the engine stop switch 80 is on, by detecting the on/off position of the switch 80 (Step S504). If the switch 80 is on and, therefore, the driver wishes to prohibit the engine from being operated after stoppage of the vehicle for some reason, e.g., in an emergency, starting or continuous operation of the engine is forcibly interrupted and the key-off processes are carried out (Steps S502 and S503) even though it is concluded in Step S501 that the battery charging is necessary, and the key-off subroutine is finished.

After concluding in Step S501 that the battery charging is necessary, if it is concluded in Step S504 that the engine stop switch 80 is off, the processor determines whether the value of the engine operation timer flag $F_{TIME}$ is "1" which indicates that the engine operation time elapsed from stoppage of the vehicle is being measured (Step S505). Immediately after the key-off subroutine is executed, the flag $F_{TIME}$ is set to "0" and accordingly, the result of decision in Step S505 becomes NO. In this case, the processor sets the flag $F_{TIME}$ to "1" and resets and starts an engine operation timer T, which measures the engine operation time elapsed from stoppage of the vehicle (Step S506). The processor then determines whether the time measured by the timer T has reached a predetermined engine operation time $T_{SET}$ after the stoppage of the vehicle (Step S507).

Since the predetermined time $T_{SET}$ is not reached immediately after the engine operation timer T is reset, the result of decision in Step S507 becomes NO. In this case, the processor delivers an alarm output to the alarm lamp 9 to light the same, thereby informing the driver that the continued operation of the engine after the stoppage of the vehicle is not due to a vehicle trouble or the like (Step S508). Then, the processor executes an engine control subroutine similar to that shown in FIG. 11 (Step S509), whereby the operation of the engine 40 is started to charge the battery 20.

The aforementioned series of Steps S501, S504, S505 and S507 is thereafter repeatedly executed, so that the battery charging by means of engine operation is continued. If it is concluded in Step S501 that the predetermined battery storage amount is reached, or if it is concluded in Step S507 that the predetermined time $T_{SET}$ is reached, the continued operation of the engine is stopped and the key-off processes are carried out (Steps S502 and S503), whereupon the key-off subroutine is terminated. If the engine stop switch 80 is turned on before the predetermined battery storage amount is reached or before the predetermined time $T_{SET}$ is reached, the engine operation is forcibly stopped and thus the battery charging is also stopped (Step S502).

The following is a summary of the above-described operation control of the various components of the hybrid vehicle by means of the controller 60. When the starter key is turned on, computation of the current supply to the electric motor 10 and control of the motor current supply are started, and this motor control is carried out periodically, thereafter. As a result, the hybrid vehicle, which uses the motor 10 as its drive source, runs. If the storage amount of the battery 20 for vehicle drive is sufficient while the vehicle is running, the operation of the internal combustion engine 40 for driving the generator 30 is stopped, so that unnecessary discharge of exhaust gas can be prevented. If there is a possibility of the storage amount of the battery 20 becoming insufficient, the engine 40 is started to cause the generator 30 to generate electric power, so that the battery 20 is charged with the generated power. If the catalyst temperature measured before starting the engine operation is lower than the necessary temperature for the activation of the catalyst, the catalyst heater is energized to heat the catalyst. When the starter key is turned off thereafter, the aforesaid motor control is terminated to stop the vehicle running by means of the electric motor 10, and then it is determined in the key-off subroutine whether the battery storage amount is smaller than the predetermined storage amount. If the predetermined battery storage amount is not reached, the battery is charged up to the predetermined storage amount, whereby the battery charging is reliably carried out. Since such battery charging is carried out as required every time the vehicle running is stopped, the power supply from the battery 20 alone can normally enable the vehicle to run when the vehicle starts running next. Further, since the storage amount of the battery can be maintained at a required amount, the power performances of the vehicle are improved and also the cruising range is increased. The engine operation for the battery charging is continued for a predetermined time. When the engine stop switch, which is provided separately from the starter key, is turned on by the driver, starting or continued operation of the engine for charging the battery after stoppage of the vehicle is forcibly stopped.

The present invention is not limited to the foregoing embodiments, and various modifications can be made.

For example, although in the first embodiment, completion of the warm-up operation of the engine 40 is detected when the output of the water temperature gauge reaches the predetermined value, such determination may be made by using an oil temperature gauge, instead of the water temperature gauge. Further, the time elapsed from the start of the warm-up operation may be measured, so that completion of the warm-up operation is detected when a predetermined time has elapsed from the start of the warm-up operation.

In the second embodiment, the necessity for charging the battery for the catalyst heater is discriminated only when it is concluded that the battery for vehicle drive need be charged, in the main routine which is executed when the starter key is turned on. Alternatively, the necessity for charging the battery for the catalyst heater may be periodically discriminated in the main routine.

Furthermore, in the third embodiment, the alarm lamp is lighted to give information that the engine is operated for the battery charging after stoppage of the vehicle running. Alternatively, an alarm buzzer may be used, for example.

What is claimed is:

1. A method of operating a hybrid vehicle having an internal combustion engine, an electric motor for driving said vehicle, a battery for supplying electric power to said electric motor, a generator driven by said internal combustion engine for charging said battery, a starter for starting said internal combustion engine, and an exhaust gas purifying catalyst, comprising;

(a) determining whether an operation of said internal combustion engine is requested;

(b) detecting a temperature of said exhaust gas purifying catalyst;

(c) determining whether said temperature detected in said step (b) is lower than a first predetermined value;

(d) stopping said internal combustion engine when it is determined in said step (a) that said operation of said internal combustion engine is requested and determined in said step (c) that said temperature is lower than said first predetermined value;

(e) supplying electric power to said exhaust gas purifying catalyst when it is determined in said step (a) that said operation of said internal combustion engine is requested and determined in said step (c) that said temperature is lower than said first predetermined value;

(f) starting said internal combustion engine by said starter when it is determined that said temperature is higher than said first predetermined value;

(g) detecting a storage amount of said battery;

(h) detecting whether an operation of said vehicle has been terminated; and (i) continuing charging of said battery by said generator if said storage amount of said battery at an instant at which said operation of said vehicle is terminated is smaller than a second predetermined value.

2. An operating method according to claim 1, wherein said step (i) comprises the substep of continuing charging of said battery until said storage amount of said battery becomes greater than said second predetermined value.

3. An operating method according to claim 1, wherein said step (i) comprises the substep of continuing charging of said battery for a predetermined period of time.

4. An operating method according to claim 1, further comprising:

giving information indicating that said internal combustion engine is in operation while said generator, driven by said internal combustion engine, continues to charge said battery after said operation of said vehicle is terminated.

* * * * *